Nov. 17, 1959    A. B. GOUGH ET AL    2,913,570
HIGH EFFICIENCY FLOODLIGHT PROJECTOR
Filed July 18, 1957    2 Sheets-Sheet 1

Inventors:
Alfred B. Gough
Charles N. Weiler
by Richard E. Horley
Their Attorney Inventors:
Alfred B. Gough
Charles N. Weiler
by Richard E. Hosley
Their Attorney

United States Patent Office 2,913,570
Patented Nov. 17, 1959

2,913,570

HIGH EFFICIENCY FLOODLIGHT PROJECTOR

Alfred B. Gough, Salem, and Charles N. Weiler, Beverly, Mass., assignors to General Electric Company, a corporation of New York Application July 18, 1957, Serial No. 672,780

2 Claims. (Cl. 240—3)

This invention relates to light projectors, and more particularly to high efficiency floodlighting projectors.

A theoretically perfect floodlight designed for optimum light distribution would include a point source of light and would utilize a reflector in the shape of a smooth, continuous curve of revolution. In a floodlight designed to direct all light from the source with zero divergence from the floodlight reflector axis, the reflector would constitute a true paraboloid. Under practical conditions, of course, an actual point source is unattainable; and for economy of size and materials, a floodlight reflector is usually not in the form of a continuous curve. A simple paraboloidal reflector, for example, in order to have a high degree of light utilization from available light sources, would have to be inordinately large and the cost of such reflectors would be prohibitive. Therefore, modern floodlight reflectors are usually built up of a series of curves, often with discontinuities between them. The inherent properties of discontinuous reflector surfaces in floodlights often result in loss of beam efficiency and a non-uniformity of illumination.

A principal object of this invention is the provision of a compact floodlighting projector with a high degree of light utilization and superior projection efficiency.

Another object of this invention is the provision of a high efficiency floodlight projector having uniformity of light intensity and relative freedom from images of the source.

By way of a summary account of a single embodiment of the present invention, we provide a floodlighting projector having a reflector separable into two parts, a front portion and a rear portion, and means for suspending a lamp with its filament at a focal point within the reflector combination. The front reflector section has an annular specular surface in the shape of a surface of revolution defined by revolving a series of connected parabolic arcs with their foci at the focal point about a common axis coincident with the light projector axis. The axes of the parabolic arcs, however, are directed at different preselected angles to the axis of revolution so that the front reflector section projects its reflected light within a limited, predetermined angular range about the projector axis. The rear part of the reflector is formed with two reflecting sections, the rearmost of which has a faceted parabolic surface defined by a series of plane chords of a paraboloid. The axis of the rear paraboloidal surface is coincident with the projector axis in order to direct the reflected light from the rearmost portion substantially parallel with the projector axis. The second section of the rear part of the reflector is a spherical reflector surface intermediate the front and rear sections of the reflector and joining these two sections, the center of the spherical surface lying at the focal point such that the light reflected from the intermediate surface is directed back through the light source for utilization as direct light by the front reflector section.

Further details of the invention, as well as additional objects and advantages, may be better understood in connection with the accompanying drawings, wherein.

Figures 1, 2:
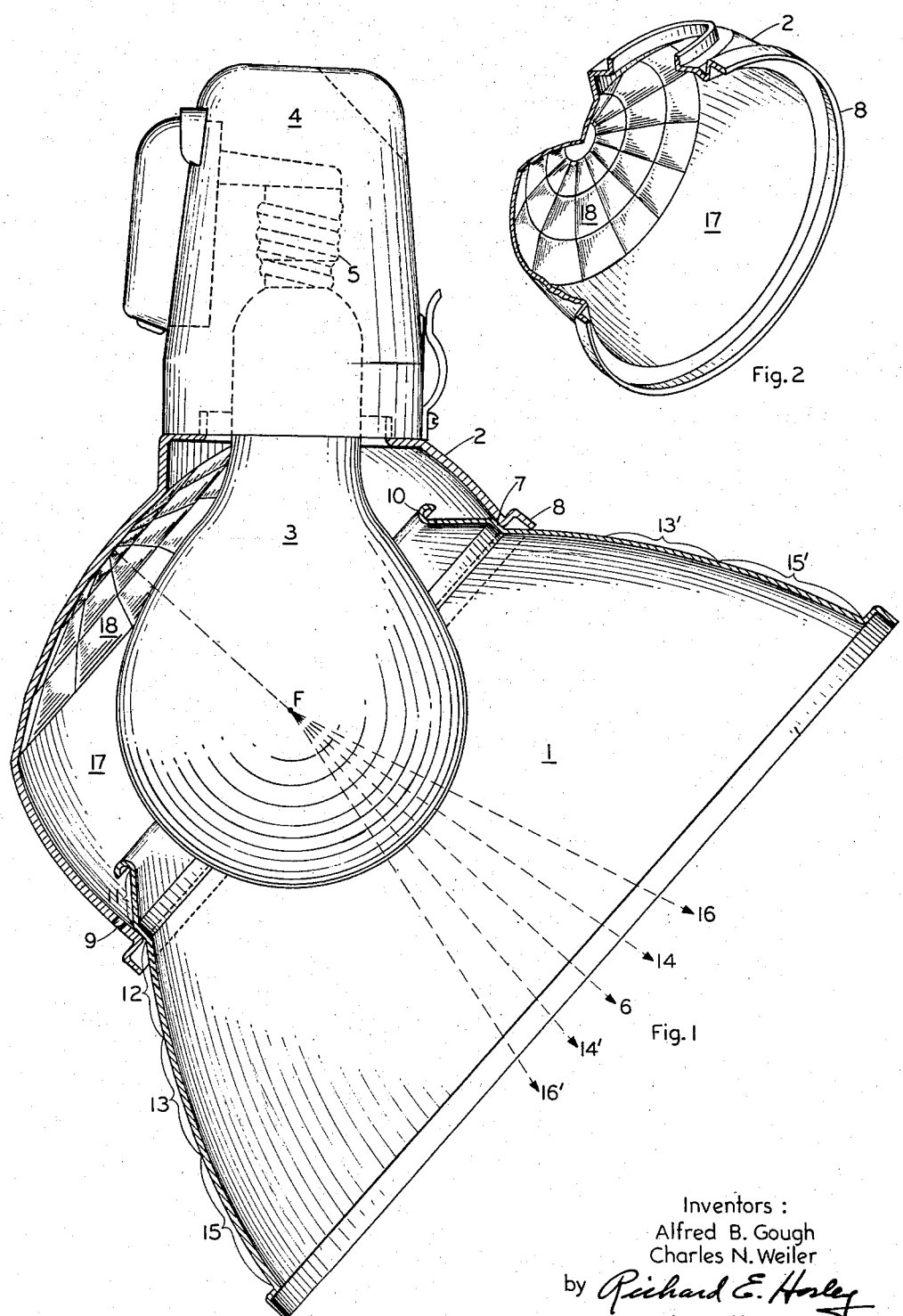
Figure 1 is a cross-sectional view of a floodlighting projector constructed in accordance with the principles of this invention.
Figure 2 is an isometric view, partially cut away, of a portion of the reflector combination shown in Figure 1.

The light projector in Figure 1 is shown to comprise a reflector with separable front and rear portions 1 and 2, respectively, and means for suspending a lamp 3 within the reflector combination, which latter means comprises a socket housing 4 in the shape of an inverted cup and having within it an electrical socket 5 shown in dotted lines. The front portion 1 of the reflector combination is telescoped within the rear part at joint center and is held thereinby external latching arrangement not shown in the drawing. As can be seen, the larger part of the lamp envelope is suspended in the region surrounded by the joint between reflector parts. Ordinarily the light projector is supported with the reflector axis 6 downwardly pointing for directing a beam of light onto a surface, normally horizontal, to be illuminated. The reflector sections are so constructed and arranged relative to each other as to form a close fit at their common joint, the front section telescoping within the rear section. An angular lip 8 on the rear part of the reflector overlies the outside of the front part of the reflector on one side of the joint between parts, and a drainage hole 9 is provided immediately on the other side of the joint in the rear reflector portion and so located that it occupies a bottom position. The front part of the reflector is provided with a trough-like flange 10 which extends into the rear part of the reflector on the inner side of the close-fitting joint 7, forming a baffle or dam which collects any water which enters through the joint draining it around the position occupied by the body of the lamp and toward the drainage hole in the bottom of the rear reflector. This unique arrangement which avoids the effects of moisture penetration in a two-part reflector combination without the necessity of employing a gasket forms no part of the present invention but is described and claimed in co-pending patent application, Serial No. 657,881, in the name of James K. Newell, assigned to the same assignee as that of the present invention.

The annular front reflector section is designed to define the main beam pattern of the floodlight distribution and for this purpose, in the preferred form of the invention shown, this section of the reflector is of a so-called offset parabolic design. That is, this reflector section is built up of a series of parabolic arcs, the axes of which are oriented sequentially at different angles to the axis of the light projector to define a medium beam width. In the form shown in Figure 1, the shape of the reflector at regions 11 and 12 is paraboloidal, the axes of these paraboloids coinciding with the axis 6 of the light projector. The parabolic arc at 13, however, is canted slightly so that its axis 14 is at approximately 7½ degrees to the reflector axis. The parabolic arc at 15 is arranged with its axis 16 sloping at a still greater angle of approximately 15 degrees with respect to the reflector axis. Each of the parabolic arcs thus defined has its focus at the light source so that within the length of each parabolic arc all the light reflected therefrom within the plane of the drawing is substantially parallel to the parabolic axis of the arc.

Because the front reflector section defines a surface of revolution about the reflector axis 6, the parabolic arcs 13' and 15' will naturally have different parabolic axes, 14' and 16', respectively, than those associated with parabolic arcs 13 and 15. Hence, the light from region 13' will cross that from region 13, each beam making an angle of approximately 7½ degrees with respect to the reflector axis. Similarly, the light from region 15' will cross the light from region 15 at some point in front of the light projector, each of these beams making an angle of approximately 15 degrees with respect to the reflector axis. The overall effect of the front reflector sections is therefore to direct reflected light within a limited angular range of the projector axis and it will be obvious that other reflector curvatures effecting the same purpose may be used within the purview of these teachings. One desirable modification may be to join the separate parabolic arcs by smooth curves in order to avoid abrupt transitions between different zones of the front reflector section. Alternatively, a single continuous curve may be drawn approximating within allowable limits the combined shape of the separate parabolic arcs.

An intermediate reflector surface 17 is spherical, the center of the spherical surface coinciding with the common focal point F of the reflector. Light reflected from the spherical portion goes back through the focus and on to the front reflector. Such double reflected light is projected in the same manner as single reflected light from the front reflector surface.

According to this invention, a rear reflector surface 18 is provided in the shape of a paraboloid truncated by plane chord surfaces. Light reflected from the rear reflector section is directed substantially parallel with the projector axis but in such a manner that there is no projected image of the light source. The striking features of the beam from the sectional or faceted reflector are its high projection efficiency, relative freedom from images of the source, and uniformity of intensity. The beam from a sectional reflector of this nature effectively radiates from a multitude of images and the whole beam is composed of many individual beams that at a sufficient distance merge into one.

Figure 3:
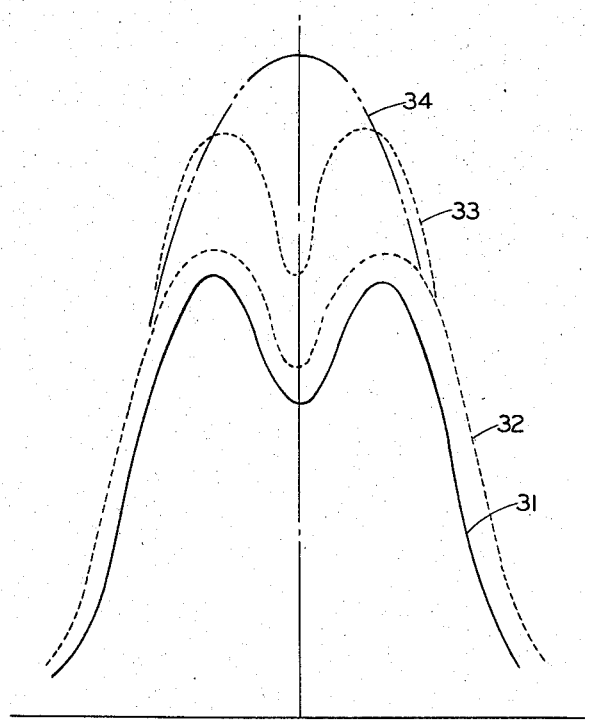
Figure 3 is a graphical analysis of the light distribution produced by the floodlight of Figure 1.

The optical properties of the faceted rear reflector section which make it so effective in the novel combination here defined are demonstrated in Figure 3, in which the height of each curve represents the intensity of the light beam on either side of the projector axis. Curve number 31 represents the light distribution from the front reflector section and is distinguished by a marked double peak which is due partly to the fact that the light source is not a true point source and partly to the annular shape of the front reflector surface. The double peak results in a "hole" in the very center of the projected beam at the very point where it is usually most desired to have an optimum illumination intensity. Curve number 32 represents the additive effect resulting from the spherical portion of the rear reflector. As might be expected, the spherical reflector surface does not eliminate the double peak from the light distribution curve but merely raises the general level of illumination by effectively increasing the intensity of the light source. Now if the rear reflector surface were merely a smooth paraboloid, the resulting light distribution would have the form shown by curve 33. It will be observed that the double peak in the light distribution curve is still not eliminated, although the intensity of illumination over the central area of the light distribution has been raised.

With the addition of a faceted parabolic rear section, however, the entire character of the light distribution curve is changed at once. Curve 34 represents the light distribution attained from the reflector combination shown in Figure 1 with all reflecting surfaces active. It is apparent that the projected light from the faceted section has so combined with that from the spherical and front parabolic sections to provide a smooth distribution affording an optimum in candle power, beam efficiency and light distribution. The faceted rear reflector surface has had the effect of blending and smoothing the distributed light in the central part of the beam without spilling light outside the beam. If the faceting were continued into the other sections of the reflector, it would have the effect of diffusing the outer areas of the beam, thereby subtracting from the optical efficiency of the reflector. By confining the faceting to the rear reflector section alone, blending of the beam has been accomplished without a sacrifice of efficiency.

Figure 4:
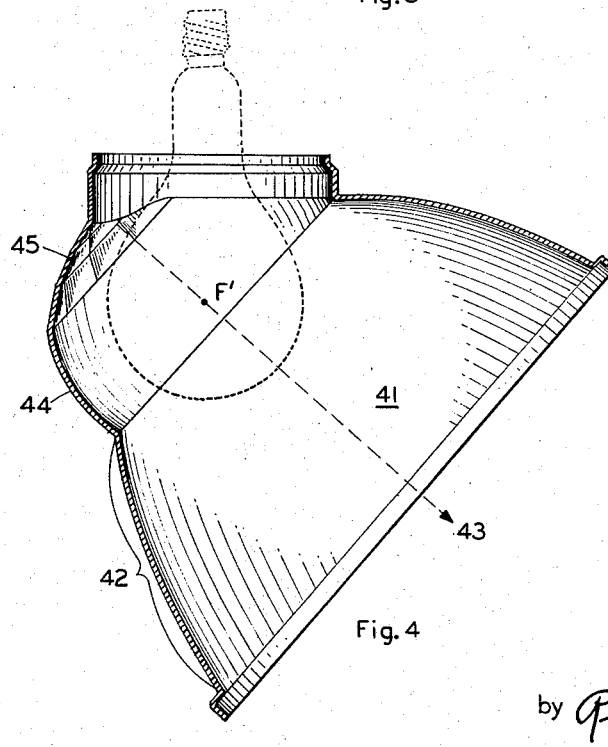
Figure 4 is a cross-sectional view of a modification of the reflector portion of the floodlight projector in accordance with the principles of this invention.

An alternate reflector construction shown in Figure 4 is in the form of a one-piece reflector designed for a narrower beam distribution than that of Figure 1, and for this purpose the front reflector section 41 has the surface of a true paraboloid of revolution. That is, its entire specular surface is generated by an arc 42 of a single parabola rotated about the parabolic axis, which in this case coincides with the axis 43 of the projector. The limited angular range within which the light reflected from front surface 41 is directed is very close to the optical axis of the floodlight shown. Spherical surface 44 functions in the same manner as previously pointed out; that is to say, it directs all reflected light back through the focus F', effectively increasing the intensity of the source. This reflected light is then again reflected by the front reflector section 41. The faceted rear reflector surface 45 functions again to smooth and evenly distribute the light in the central part of the beam. Light distribution curves for the projector reflector combination shown in Figure 4 would be similar to those of Figure 3, except that the curves would be narrower because of the lack of offset parabolic portions in the front reflector section. Such a floodlight projector is said to be a narrow-beam floodlight as distinguished from the medium beam-width floodlight described in connection with Figures 1 and 2.

It will thus be apparent to those skilled in the art to which this invention pertains that certain modifications, alterations and substitutions may be made within the teachings without departing in spirit from the scope of the invention defined in the following claims.

What we claim as new and desire to secure by Letters Patent of the United States is:

1. In a compact high efficiency floodlight projector having a principal axis of light projection and means for suspending a light source at a focal point along said axis within said projector, the reflector for said projector comprising: an annular concave front reflector section having a specular surface defined by the surface of revolution of a parabolic arc having its focus at the light source, the axis of said parabolic arc coinciding with said principal axis whereby said front reflector section directs reflected light substantially parallel to said principal axis, the distribution of the light from said front reflector section being such that at a predetermined distance from said light source the intensity of the front reflector light beam is substantially greater on either side of said principal axis to thereby result in a hole in its center portion; a faceted rear reflector section defined by a series of plane chords of a paraboloid which has its axis coinciding with said principal axis, said rear reflector section being located behind the light source and disposed to direct reflected light substantially parallel with said principal axis, the area of said faceted section being such that the light reflected therefrom is confined substantially within said center portion of said front reflector light beam to fill the hole therein and thus produce a composite projector light beam characterized by a smooth blended light distribution which at said predetermined distance and beyond has the intensity of its light greatest along said principal axis; and an intermediate reflector section joining said front and rear sections and having a spherical specular surface with the spherical center at the light source.

2. In a compact high efficiency floodlight projector having a principal axis of light projection and means for suspending a light source at a focal point along said axis within said projector, the reflector for said projector comprising: an annular concave front reflector section having a specular surface defined by the surface of revolution of a series of connected parabolic arcs having their foci at the light source, the parabolic arc nearest said light source having its axis coinciding with the principal axis of said projector, the other parabolic arcs of said series which are disposed at successively greater distances from said light source having their axes disposed at successively greater angles to said principal axis whereby said front reflector directs reflected light within a limited angular range of said principal axis, the distribution of the light from the front reflector section being such that at a predetermined distance from said light source the intensity of the front reflector light beam is substantially greater on either side of said principal axis to thereby result in a hole in its center portion; a faceted rear reflector section defined by a series of plane chords of a paraboloid which has its axis coinciding with said principal axis, said rear reflector section being located behind the light source and disposed to direct reflected light substantially parallel with said principal axis, the area of said faceted section being such that the light reflected therefrom is confined substantially within said center portion of said front reflector light beam to fill the hole therein and thus produce a composite projector light beam characterized by a smooth blended light distribution which at said predetermined distance and beyond has the intensity of its light greatest along said principal axis; and an intermediate reflector section joining said front and rear sections and having a spherical specular surface with the spherical center at the light source.

References Cited in the file of this patent

UNITED STATES PATENTS

| | | |
|---|---|---|
| 1,670,837 | Blackmore | May 22, 1928 |
| 2,040,821 | Benjamin | May 19, 1936 |
| 2,142,467 | Waterbury | Jan. 3, 1939 |
| 2,341,658 | Salani | Feb. 15, 1944 |

FOREIGN PATENTS

| | | |
|---|---|---|
| 344,143 | Great Britain | Mar. 5, 1931 |